United States Patent [19]

Marchant et al.

[11] Patent Number: 4,539,573
[45] Date of Patent: Sep. 3, 1985

[54] PROTECTIVE CONSTRUCTION FOR OPTICAL DISK UNITS

[75] Inventors: Alan B. Marchant, Rochester; Dennis G. Howe, Pittsford, both of N.Y.

[73] Assignee: Eastman Kodak Company, Rochester, N.Y.

[21] Appl. No.: 507,447

[22] Filed: Jun. 24, 1983

[51] Int. Cl.³ .................. G01D 15/32; G11B 5/52
[52] U.S. Cl. .................. 346/137; 346/135.1; 369/284; 369/287
[58] Field of Search .................. 346/76 L, 137, 135.1; 369/284, 286, 287; 358/297

[56] References Cited

U.S. PATENT DOCUMENTS

| D. 252,470 | 7/1979 | Pawlak | D24/54 |
|---|---|---|---|
| 4,038,663 | 7/1977 | Day et al. | 346/1 |
| 4,074,282 | 2/1978 | Balas, Jr. et al. | 346/135 |
| 4,334,302 | 6/1982 | Peppers | 369/261 |
| 4,365,258 | 12/1982 | Geyer et al. | 346/137 |
| 4,447,899 | 5/1984 | Geyer et al. | 369/111 |
| 4,449,139 | 5/1984 | Geyer et al. | 346/137 |
| 4,507,774 | 3/1985 | Marchant | 369/271 |

FOREIGN PATENT DOCUMENTS

WO81/03712 12/1981 PCT Int'l Appl. .

Primary Examiner—E. A. Goldberg
Assistant Examiner—Gerald E. Preston
Attorney, Agent, or Firm—Warren W. Kurz

[57] ABSTRACT

An optical disk unit, of the kind having a record element and a flexible cover sheet that are attached around an outer periphery in a manner providing an outer spacing and a generally enclosed inter-space therebetween, has an improved construction which significantly reduces the likelihood of contact between the record element and cover sheet. Central spacing means provide a central sheet-to-element spacing that is significantly larger than said outer spacing and vent means, into and out of the inter-space cause a reduction in the spacing between the record portion of the element and the cover sheet during write/read operation. The air flow through the vent means also reduces the formation of visible debris in the enclosed record element/cover sheet inter-space.

11 Claims, 5 Drawing Figures

PROTECTIVE CONSTRUCTION FOR OPTICAL DISK UNITS

BACKGROUND OF THE INVENTION

1. Field of the Invention

The present invention relates to optical disk units adapted for the optical writing and/or reading of high density information and more particularly to improvements in unit constructional features that protect record portions of the disk units, e.g. from dust or damage.

2. Description of the Prior Art

Optical disk units generally include a record stratum containing (or adapted to be recorded with) minute information marks (e.g. pits). Such small marks are extremely susceptible to damage, e.g. alteration, by contact and can be obscured by dust particles. Therefore, many optical disk unit constructions provide protection for the record stratum. For example, U.S. Pat. No. 4,038,663 and International Application WO 81/03712 disclose optical disk units wherein a transparent cover disk is centrally attached to the record element and, during operative rotation, flies above the record stratum. In both of these systems a stream of filtered air is introduced at a central position between the record stratum and cover sheet and flows outwardly due to centrifugal force imparted by the rotating disk unit.

U.S. Pat. Nos. 4,074,282 and 4,365,258 disclose disk units wherein a cover sheet is supported around its outer periphery in spaced relation to a record element so as to provide a substantially enclosed air space between the record element and the cover sheet. In the '258 patent the cover sheet is a flexible web material and cylindrically symmetric web tensioning assists in maintaining the cover sheet/record element spacing. While the use of flexible web cover sheets has advantages from optical and fabrication viewpoints, such webs are more susceptible to contacting the record surface, e.g. due to dimensional changes (causing sag) or due to flexure during handling. It is desirable to avoid contact between the cover sheet and record element and this militates toward disk unit designs having a greater spacing of the cover sheet from the record surface. However, a contrary design constraint exists because it is desirable to use small, lightweight write/read lenses of high numerical aperture and such lenses are necessarily located close to the record element surface. Thus, large spacing of a cover sheet from the record surface increases the risk of contact between the cover sheet and such lightweight, high numerical lenses during write/read operations.

SUMMARY OF THE INVENTION

One significant purpose of the present invention is to provide for flexible cover sheet optical disk units, improved constructions that reduce the likelihood of the cover sheet contacting either the record portion of the record element or the write/read lens. Another extremely important feature of the present invention is that its structural and functional approach significantly reduces the creation of large particles of recording debris in the relatively enclosed cover sheet/record element inter-space (e.g. between the record element and cover sheet of units with peripherally-supported cover sheets). Another important advantage of the present invention is that it allows simplified disk unit fabrications (i.e. having flexible cover sheets), while obtaining advantages of more rigid protective structures.

Thus in one aspect the present invention provides improvements in an optical disk unit constructions of the kind including a record element, a flexible cover sheet which is generally coextensive with the record portion of the record element and spacing means which couples outer peripheral portions of the record element and the cover sheet in a manner generally enclosing the record element/cover sheet inter-space. In one aspect such improvements comprise radially inward spacing means which contact portions of the record element and the cover sheet to define a radially inner, sheet-to-element spacing that is predeterminedly greater than the radially outer sheet-to-element spacing; and radially inner and outer vent means for allowing continuous, predetermined air flows respectively into and out of such inter-space during operation disk rotation.

DESCRIPTION OF THE DRAWINGS

The subsequent description of preferred embodiments refers to the attached drawings wherein.

DETAILED DESCRIPTION OF THE PREFERRED EMBODIMENTS

Figure 1:
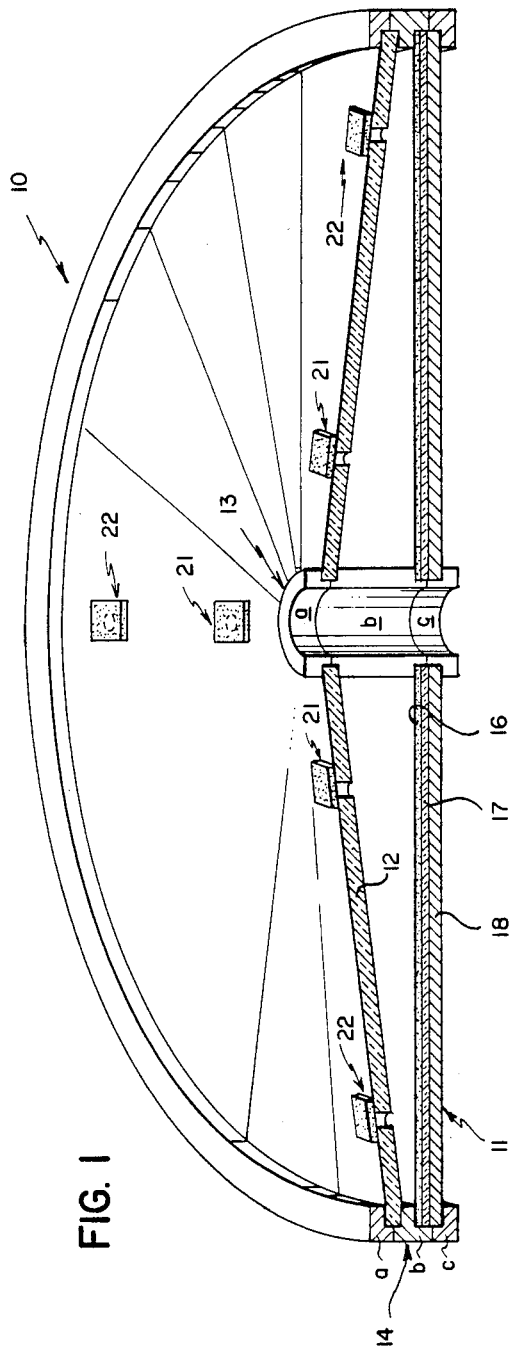
FIG. 1 is a perspective view, partially in cross-section, showing one preferred embodiment of optical disk unit construction in accord with the present invention.

The optical disk unit 10 shown in FIG. 1 in general comprises a record element 11 and a cover sheet 12 which are supported in spaced relation by inner and outer spacing means 13 and 14. In the FIG. 1 embodiment the record element 11 and the cover sheet 12 are both in the form of flexible webs and are retained in slight tension by inner and outer annular rings (13a, 13b, 13c and 14a, 14b, 14c) as shown in more detail in FIG. 2. U.S. Pat. No. 4,365,258 discloses various alternative retaining structures for supporting flexible cover sheets and record elements in spaced relation. Note however that the present invention is equally useful with disk units having non-flexible record elements, e.g. as illustrated by subsequently described embodiments.

The record element shown in FIG. 1 is of the kind disclosed in U.S. Pat. Nos. 4,336,545 and 4,360,908 and in general comprises a thermally deformable dye/binder layer 16 overlying a reflective layer 17 on a film support 18. An annular zone of the dye binder layer located between the inner and outer retaining rings provides the record portion of the record element. It will be understood, however, that the present invention is applicable for use with many other optical disk recording media, including those using readout by light transmission rather than light reflection.

The cover sheet 12 of the FIG. 1 embodiment is a flexible film which is transparent to the operative writing and reading wavelength(s) of the write/read system for which the record element 11 is designed. Preferred disk cover sheets are substantially non-birefringent, substantially homogeneous and free from striae and significant occlusions. Cellulose tri-acetate and polycarbonate films are suitable materials for forming cover sheets in accord with the present invention.

It is preferred to have a cover sheet thickness in the range from about 0.025 mm to about 0.25 mm with a thickness variation in the order of ±10μ. The upper preferred thickness and thickness variation tolerance are related to desired lens operation through the disk cover and the lower limit of the preferred thickness range relates to cover sheet sturdiness. Use of such thin, transparent cover sheets (with an intervening air gap), considerably reduces the effects of aberrations induced by thickness variation when focusing with high or moderately high numerical aperture objectives, i.e. as compared to a continuous overcoat protective layer, which needs greater thickness to produce a similar protective effect. If disk cover sheet thicknesses less than 0.18 mm are used, ordinary biological microscope objectives that are corrected to work through glass plates that are between 0.170 and 0.180 mm in thickness can be used. Such lenses generally have working distances (the distance from the last lens element surface to the focus) of 0.5 mm or less.

The position of such a thin disk cover between the lens and the record portion surface does not affect the focused write or read spot except insofar as the degree to which scratches, debris or defects on, or within, the cover sheets interfere with that spot. The preferred minimum operative spacing between record element and cover sheet therefore depends (from an optical viewpoint) on the numerical aperture of the lens utilized, the thickness of the disk cover and the desired degree of protection from dirt and scratches on the external cover surface. For a cover sheet having a refractive index of n=1.5, the table set forth below illustrates useful minimum operative spacings "S" (i.e., between the record portion surface of the record element and the bottom of the cover sheet in the utilized annular portion of the disk) that will provide the same degree of protection from dust, scratches, etc., as does a 1 mm thick, in situ, transparent overcoat of index n=1.5 used with a 0.5 NA lens. The table lists S for various NA lenses and cover sheet thicknesses of 100μ, 133.4μ and 175μ.

| NA | S (100μ) | S (133.4μ) | S (175μ) |
| --- | --- | --- | --- |
| 0.5 | 0.545 mm | 0.5246 mm | 0.4991 mm |
| 0.6 | 0.4085 mm | 0.3891 mm | 0.3648 mm |
| 0.65 | 0.353 mm | 0.3342 mm | 0.3108 mm |
| 0.7 | 0.3032 mm | 0.2853 mm | 0.2629 mm |
| 0.75 | 0.2578 mm | 0.2408 mm | 0.2196 mm |
| 0.8 | 0.2152 mm | 0.1994 mm | 0.1797 mm |
| 0.85 | 0.1743 mm | 0.1601 mm | 0.1423 mm |
| 0.9 | 0.1332 mm | 0.1211 mm | 0.1059 mm |
| 0.95 | 0.08814 mm | 0.0792 mm | 0.06797 mm |

It will be appreciated by one skilled in the art, that with the "S" values noted above and 0.025 mm to 0.100 mm for clearance between the top of the cover and the lens, biological objectives with small working distances can be used. However, for the reasons discussed above it would be desirable (from the viewpoint of avoiding cover sheet-record element contact) to have increased "S" distances when the disk unit is not in operation.

Figure 2:
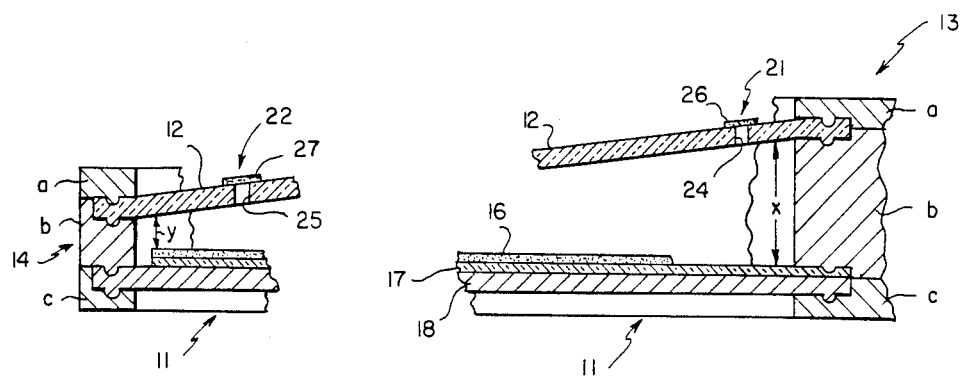
FIGS. 2 and 3 are schematic cross-sectional views further illustrating the structure and function of the FIG. 1 disk unit.

It will be noted generally in FIG. 1 and seen more clearly in FIG. 2, that in accord with the present invention, the spacing of the cover sheet 12 from the record portion surface varies to a relatively large extent in radial direction when the disk unit 10 is in its inoperative (non-rotating) condition. Thus the radially inner spacing means 13 supports the record element 11 and cover sheet a distance "x" apart, which is significantly larger than the distance "y" that outer spacing means 14 defines between the cover sheet and the record element. It is highly preferred that the spacing "x" be at least 200μ greater than the spacing "y" and this aspect of the present invention reduces the likelihood of contact between the cover sheet and the record portion of the record element. The added safety provided by this construction can be utilized in various ways, e.g. enabling less tension in mounting, allowing thinner cover sheet material and/or assuring minimum possibility of contact.

However one will observe that the increase in spacing (e.g. distance "x") of the cover sheet from the record element surface presents a problem for high numerical aperture lens assemblies that have relatively small working distances. This difficulty is avoided in accord with the present invention by predeterminedly constructing inner and outer vent means 21 and 22. In the FIGS. 1–3 embodiment such vent means are constructed as apertures 24 and 25 respectively having dust filter means 26 and 27 thereover. It is preferred that the vent means be located symmetrically around the disk unit and that they are located respectively radially inward and radially outward relative to the annular write/read zone, i.e. record portion, of the record element 11.

Figure 3:
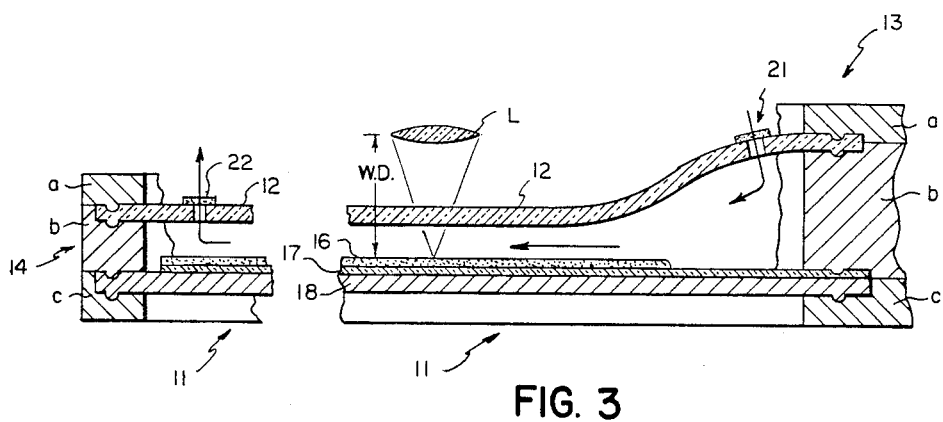

In FIG. 3 the disk unit 10 is shown schematically during operative rotation and it can be seen how the predetermined vent construction of the present invention serves to decrease the operative record element-/cover sheet spacing of the disk unit. During the high speed (e.g. 1800 RPM) rotation for writing or reading of the disk unit 10, a radially outward air flow is created by centrifugal forces imparted to the air in the cover sheet/record element inter-space. We have found that if the inner and outer vent means are constructed properly: (1) a predetermined and stable radial pressure gradient can be achieved in the record element/cover sheet inter-space and (2) with the presence of such gradient on one side, and atmospheric pressure on the other, the cover sheet will stably assume a "lowered" position such as shown schematically in FIG. 3. A lens L of working distance "W.D." which is less than distance "x" therefore can be properly focused on tracks at all operative radii of the disk unit's record portion without "crashing" on the cover sheet. (In this regard note that a highly efficient information format provides that innermost tracks are at a radius R/2 where R is the outermost track radius.)

Considering the foregoing one will appreciate that the disk unit construction shown in FIG. 1 is extremely useful in avoiding record element/cover sheet contact in the inoperative modes and providing a decreased inter-spacing (suitable for light-weight, high numerical aperture lenses) in the operative modes. Furthermore, we have found that the present invention provides another highly important advantage. Specifically, we have found that the same air flow which controls the cover sheet/record element inter-space will inhibit the coagulation of the ultrafine recording debris particles (e.g. such as result from the thermal ablative deformation of the recording layer). In previous operation with sealed disk units without such controlled air flow, we have observed an increase in the noise levels during the optical reading of written (pitted) regions of the record layer. We have confirmed by electron-microscope that this noise level increase is caused by the presence of coagulated debris particles that are large enough to impair pit markings and/or readout. We believe that the radial air shear provided at the recording sites, by air flow according to the present invention, spreads the initial particle cloud sufficiently to prevent coagulation. When the resultant debris settles uniformly as a large number of uncoagulated particles, its adverse effects are highly reduced. Further, in systems employing layer constructions and readout methods such as disclosed in U.S. Pat. No. 4,360,545, such debris is substantially optically invisible.

In order to maintain one of the original functions of the cover sheet (i.e. to protect the record layer from dust), it is highly preferred that at least the radially inward vent means e.g. air inlets 21 in FIGS. 1-3 be filtered. The filters desirably have low resistance to air flow and the ability to trap particles larger than $0.2\mu$, e.g. a pore size $\leq 1\mu$. For this purpose, we have found it preferred to use as filter means 26 removable pre-filters, e.g., a Millipore pre-filter (manufacturer's identification code AP) in conjunction with permanent filter, e.g., Millipore $1\mu$ (manufacturer's identification code FALP). The pre-filter can be periodically replaced to maintain good air flow and preferably have a pull-away adhesive bond to peripheral portions of permanent filters. In the FIG. 1 embodiment the radially outer vent means 22 also have filters, however, these may be omitted as potentially contaminated back air flow does not ordinarily occur.

From the foregoing description of the general principles of the present invention, it will be understood that the particular inner and outer cover sheet spacings (e.g. "x" and "y" in FIG. 2) that are selected by one skilled in the art will depend on other system parameters such as cover sheet thickness, disk unit diameter, the numerical aperture and working distance of the write/read lens, etc. The relative cross-sectional area of the vent means will similarly depend on these parameters as well as upon the air shear rate required to avoid visible debris.

By way of general exemplary guidelines, we have found it preferable that the cover sheet spacing and air flow rates be such that, in operation, the cover sheet to record surface spacing be greater than about 6 mils around the write/read zone of the disk unit and a safe distance from the write/read lens in its operative position. Also it is preferred that within this operative write/read zone the cover sheet be approximately parallel to the record portion of the record element, most preferably to within about $\pm 1°$. Given these desired operative characteristics it is desirable that the non-operative spacing of the cover sheet be as far as possible from the record portion of the record element.

In selecting appropriate vent means constructions, it is desirable from the viewpoint of cover sheet displacements that the pressure in the cover sheet/record element inter-space be: (1) slightly less than atmospheric just inside the radially inner vent means, (2) dropping significantly below atmospheric at the middle annuli and (3) rising to about atmospheric at the outer vent means. From the viewpoint of preventing objectionable debris formation, it is highly desirable that the air flow from inner to outer vent means provide a radial air shear at the record element surface which is $\gtrsim 2 \times 10^4$ sec.$^{-1}$. For a 12" diameter disk unit we have found that inner and outer vent means providing a cumulative air flow rate of $\gtrsim 10$ cm$^3$/sec is highly useful. The actual size (and number) of vent openings will depend on the air impedance presented by the selected filters. For low impedance filters vent means with a cumulative cross-sectional air flow area of as low as about 2% of the cover sheet area are useful. It is important that the filter means not be allowed to collapse into contact with the other disk unit portions as this would reduce their effective flow through area.

Figure 4:
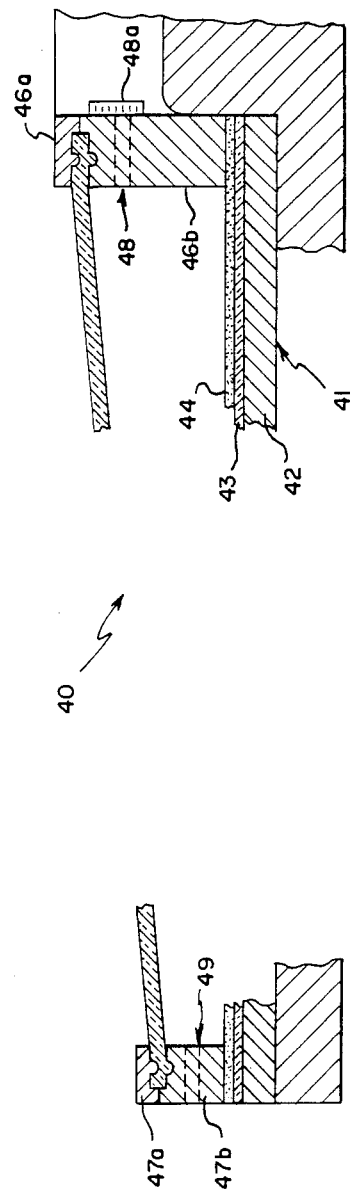
FIGS. 4 and 5 are schematic cross-sectional views similar to FIG. 2, but illustrating alternative preferred embodiments of the present invention.

As noted above, disk units according to the present invention need not have a flexible record element. The disk unit 40 shown in FIG. 4 has a rigid record element 41 which comprises a rigid support, e.g. a molded plastic disk 42, a reflective layer 43 and a recording layer 44. The flexible cover sheet 45 of unit 40 is supported in a slightly tensioned condition by inner and outer ring portions 46a, 46b and 47a, 47b. The portions 46b and 47b are affixed, e.g. by adhesive to the record element and are relatively sized to give the desired differential spacing of inner and outer cover sheet portions. In this embodiment the inner and outer ventilation means 48 and 49 comprise air channels extending through ring portions 46b and 47b, rather than holes through the cover sheet. The inner vent means has a filter 48a.

Figure 5:
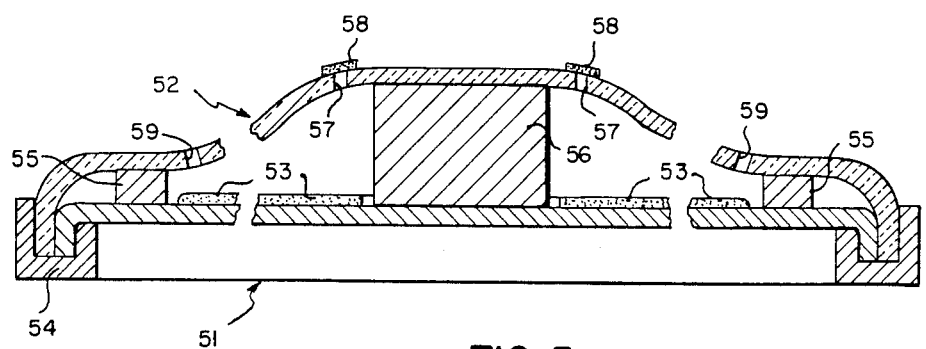

FIG. 5 illustrates another preferred embodiment of the present invention. In this disk unit 50 the cover sheet 52 and record element 51 are both flexible films and in fabrication are gripped in slight tension by outer peripheral ring 54. Outer spacer ring 55 defines the outer radial cover sheet/record element spacing and central spacer 56 defines the larger inner radial spacing. The inner vent means 57 covered by filter 58 are located radially inward of the inner record portion 53, and the outer vent means 59 are located proximate the outer radius of record portion 53. During operative rotation the air flow, into vent means 57 and out of vent means 59, effects the controlled downward displacement of the cover sheet 52 to its operative relation with the record portion of the disk element. The same air flow prevents the formation of visible debris.

The invention has been described in detail with particular reference to preferred embodiments thereof, but it will be understood that variations and modifications can be effected within the spirit and scope of the invention.

What is claimed is:

1. In an optical disc unit of the kind including: (a) a disk-shaped record element, having a record portion; (b) a flexible cover sheet which opposes and is generally coextensive with record portion and (c) outer spacing means which couples outer peripheral portions of said record element and cover sheet in a manner which generally encloses the space therebetween and defines an outer sheet-to-element spacing, the improvement comprising:

(1) inner spacing means which cooperate with radially inner portions of said record element and said cover sheet to define an inner sheet-to-element spacing that is predeterminedly greater than said outer spacing; and
    (2) radially inner and outer vent means for allowing a continuous air flow into and out of the space between said record element and said cover sheet during disk unit rotation, said vent means being constructed to cause said cover sheet to flex to a position in which it is closely spaced from and generally parallel to said record portion.

2. The invention defined in claim 1 wherein said inner vent means includes filter means for preventing passage of dust particles into said space.

3. The invention defined in claim 2 wherein said outer vent means includes dust filter means.

4. The invention defined in claim 1 wherein said inner spacing means provides a sheet to element inner spacing greater than about 6 mils.

5. The invention defined in claim 1 wherein said vent means together have a cumulative cross-sectional air flow area which is at least 2% of said cover sheet area.

6. The invention defined in claim 1 wherein said inner and outer spacing means are respectively radially inward and radially outward from the record portion of said record element.

7. The invention defined in claim 1 wherein said vent means comprise apertures in said cover sheet.

8. The invention defined in claim 1 wherein said vent means are constructed to provide a radial air shear a the record portion of at least $2 \times 10^4 \text{ sec}^{-1}$.

9. The invention defined in claim 1 wherein said outer spacing means provides a sheet-to-element spacing greater than about 6 mils and said inner spacing means defines a sheet-to-element spacing at least 200μ greater than that defined by said outer spacing means.

10. An optical disc unit comprising:

(a) a disk-shaped record element having an annular record portion extending from an inner radial location to an outer radial location;
(b) a flexible, disk-shaped cover sheet having a light transmissive portion opposing said record portion;
(c) outer spacing means, extending around said disc unit at position radially outward from said record portion, for defining an outer record element/cover sheet spacing;
(d) inner spacing means located radially inward from said record portion for defining an inner record alement/cover sheet spacing which is predeterminedly greater than said outer spacing; and
(e) radially inner and outer vent means for allowing air to flow into the inter-space between said cover sheet and record portion at a central region and to egress said inter-space at a location proximate the outer radial location of said record portion said inner and outer vent means being constructed so that during operative rotation of said disk unit the air flow therethrough causes the cover sheet to move to a position closely spaced from and generally parallel to said record portion.

11. The invention defined in claim 10 wherein said inner spacing means defines an inner record element/cover sheet spacing at least 200μ greater than that defined by said outer spacing means.

* * * * *